US005657163A

United States Patent [19]

Wu et al.

[11] Patent Number: 5,657,163

[45] Date of Patent: Aug. 12, 1997

[54] FIBER OPTIC ILLUMINATION OF HUD IMAGE SOURCE

[75] Inventors: Ning Wu, Rancho Palos Verdes; I-Fu Shih, Los Alamitos; Jerome R. Laskowski, Newbury Park, all of Calif.

[73] Assignee: Delco Electronics Corporation, Kokomo, Ind.

[21] Appl. No.: 455,864

[22] Filed: May 31, 1995

[51] Int. Cl.$^6$ .................................................... G02B 27/14

[52] U.S. Cl. .......................... 359/630; 359/631; 359/633

[58] Field of Search .................................... 359/630, 631, 359/632, 633

[56] References Cited

U.S. PATENT DOCUMENTS

| | | | |
|---|---|---|---|
| H1109 | 10/1992 | Roberts | 340/705 |
| 4,158,310 | 6/1979 | Ho . | |
| 4,210,029 | 7/1980 | Porter . | |
| 4,322,978 | 4/1982 | Fromm . | |
| 4,322,979 | 4/1982 | Fromm . | |
| 4,547,668 | 10/1985 | Tsikos . | |
| 4,588,886 | 5/1986 | Snider . | |
| 4,589,286 | 5/1986 | Berthold . | |
| 4,620,093 | 10/1986 | Barkhoudarian . | |
| 4,687,927 | 8/1987 | Iwamoto . | |
| 4,781,059 | 11/1988 | Sazuki . | |
| 4,795,223 | 1/1989 | Moss | 350/3.75 |
| 4,805,630 | 2/1989 | Storey . | |
| 4,961,625 | 10/1990 | Wood | 359/630 |
| 4,973,139 | 11/1990 | Welhrauch . | |
| 5,127,269 | 7/1992 | Grudzien, Jr. . | |
| 5,138,155 | 8/1992 | Gray . | |
| 5,170,153 | 12/1992 | Migozzi | 340/705 |
| 5,275,053 | 1/1994 | Wlodarczyk . | |

*Primary Examiner*—Georgia Y. Epps
*Assistant Examiner*—John P. Cornely
*Attorney, Agent, or Firm*—Viji D. Duraiswamy; Jimmy L. Funke

[57] ABSTRACT

The image source of a head up display for a motor vehicle is illuminated from a remote high intensity source using fiber optics. The HUD image source and optics are under the dash pad of the vehicle and include color LCD or color filtered image source. The image is lighted by a high intensity light source which yields a bright projected image and which generates substantial heat. The light source includes lamps in a fan-cooled heat sink located in the vehicle engine compartment, for example, and coupled to the image source by fiber optic light guides. The light guides abut the image source to uniformly light small image patterns commensurate with the light guide size, or light spreading techniques are used for larger image patterns.

8 Claims, 2 Drawing Sheets

FIBER OPTIC ILLUMINATION OF HUD IMAGE SOURCE

FIELD OF THE INVENTION

This invention relates to the illumination of image sources for head up displays and particularly to such illumination utilizing fiber optics for lighting image sources from remote locations.

BACKGROUND OF THE INVENTION

Head up displays (HUDs) used in automotive vehicles produce a virtual image by projecting a light pattern from an image source and reflecting it from a windshield in the line of sight of the operator. Windshields have a reflectivity less than 18%; thus in order to view the HUD image under bright sunlight conditions, a very bright image source is required.

The image sources used for HUDs include vacuum fluorescent displays (VFDs) and matrix addressable liquid crystal displays (LCDs). The brightness of a VFD is limited by the light emission mechanism of the phosphor which is bombarded by energetic electrons. Even though the brightness of VFDs have been improving over the years, it is expected to be less than 15,000 foot-lambert (fl) for the bluish-green color, and much less for other colors. On the other hand, LCDs can provide a much brighter colored reconfigurable image source if bright illumination is available. The conventional illumination source is an incandescent bulb with collimating optics in the proximity of the LCD. Since the image source and related optics are located beneath the vehicle dash board, the packaging space requirements and the heat output of the lamps near the image source often can not be accommodated, especially for high brightness lamps.

SUMMARY OF THE INVENTION

It is therefore an object of the invention to illuminate HUD image sources in limited space and low heat dissipation locations with bright light sources. Another object is to illuminate automotive HUD image sources from remote locations. A further object is to attain bright colored automotive HUD images.

The invention is carried out by locating a high intensity light source in a remote location where space is available and the heat generation does not cause a problem, and coupling light from the source by fiber optics to the HUD image source. The image source and optics is located between the firewall and instrument panel, the horizontal dash portion having a window to allow projecting an image toward the windshield. The light source is located in more accommodating space such as on the engine side of the firewall or in the glove compartment and one or more light guides conduct light to the image source.

The image source is an active matrix color LCD which is reconfigurable to generate an image pattern according to electronic display inputs, or it may simply be a color slide bearing at least one fixed image or icon. Where several such icons are provided, they are individually illuminated by coupling each to a lamp via a light guide and switching the lamp on to display that icon. Each icon in the image source can be quite small and the light guide aperture as large as the icon so that the end of the light guide is simply butted against the slide or LCD to uniformly and brightly illuminate the icon. Where an image area larger than a light guide diameter is to be lighted, several light guides are used along with a diffuser to uniformly scatter the light. Alternatively, the larger image source may be lighted by a single light guide with collimating optics to evenly disperse the light to the image source.

The light source may include high intensity lamps, one for each light guide and cooling means and/or heat filters to protect the light guide from the lamp heat. In particular, two spaced aluminum blocks or heat sinks have several bores, each bore holding a lamp in one end and a light guide in the other end to assure alignment for efficient light coupling. A slot in each block between the lamps and light guides holds a heat blocking glass element to limit the direct transfer of heat from the lamp to the light guide. Cooling passages transverse to the bores aid in heat dissipation and a fan between the blocks draws air through the passage.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
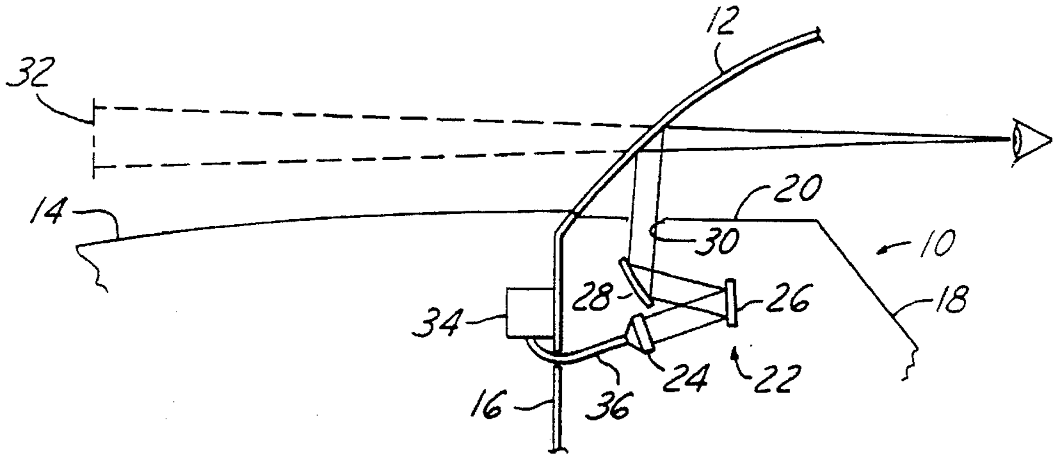
FIG. 1 is a partial cross section of a motor vehicle incorporating a head up display according to the invention.

Referring to FIG. 1, an automobile 10 has a windshield 12, a hood 14, a firewall 16 separating an engine compartment beneath the hood from a passenger compartment, an instrument panel 18, and a dash pad 20. A HUD 22, except for its light source, is located beneath the dash pad 20 between the instrument panel 18 and the firewall 16. The HUD, as known in the prior art, typically includes an image source 24, a fold mirror 26, and an aspheric mirror 28 which projects an image through a window 30 in the dash pad 20 to the windshield 12 where it is reflected to the operator as a virtual image 32 suspended in front of the windshield in the normal line of sight of the operator. The aspheric mirror 28 is designed to focus the image source in a manner to produce the desired virtual image 32 and includes compensation for the effects of windshield curvature on the image. The fold mirror 26 is optional and is useful to assist in compact packaging of the HUD. The image source 24 heretofore has generally comprised a self-luminous device such as a VFD or a non-luminous device such as an LCD which is backlighted by one or more incandescent lamps. The VFD can obtain high brightness in a bluish green color, and is not suitable as a bright display where other colors are desired. The LCD is available in various colors and the display brightness depends on the light source. High intensity sources, however produce too much heat for installation in the confined space under the dash. Thus a remote light source 34 located on the other side of the firewall 16, for example, is coupled by a fiber optic conductor 36 extending through the firewall 16 to the image source 24 of the display.

This improvement alleviates the space constraints of the under-dash region and also avoids the substantial amount of heat generation in that region. Other remote locations such as the vehicle glove box can be the site of the light source. The use of fiber optics can, as revealed below, eliminate the need of collimating optics adjacent the image source which has been required for use with a backlighting lamp. On the other hand, simple collimating optics are useful in some applications of fiber optic illumination.

Figure 2:
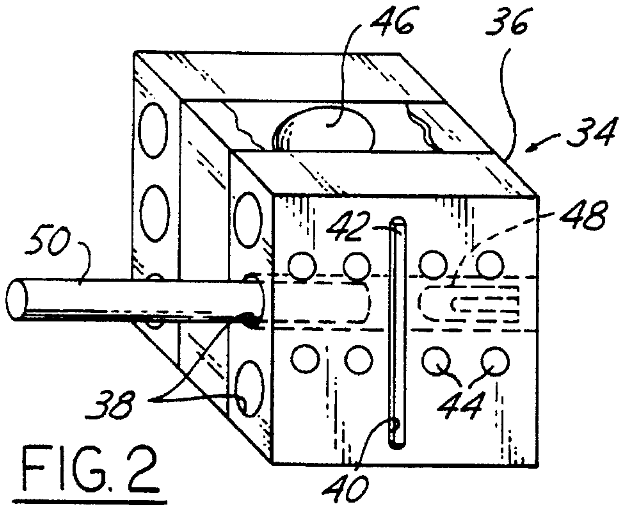
FIG. 2 is an isometric view of a light source for the head up display, according to the invention.

The light source 34, shown in FIG. 2, comprises a heat sink including a pair of spaced blocks 36 of heat conducting material such as aluminum, each block 36 having several bores 38 extending from side to side and interrupted by a transverse slot 40 containing a heat blocking glass 42. Transverse passages 44 through the blocks are provided for cooling airflow. A fan 46 enclosed between the blocks 36 draws cooling air through the passages 44 to dissipate heat generated by lamps. A high intensity incandescent lamp 48 in one side of each bore 38 (only one shown) is aligned with a fiber optic light guide 50 in the other side of each bore. The ends of the light guides 50 are separated from the lamps 48 by the heat blocking glass 42 to minimize direct heat transfer from the lamp 48 to the light guide 50. Since the air cooling of the heat sink prevents substantial heat flow to the light guides via the blocks 36, the light guides are protected from the heat generating lamps 48. Since each light guide is illuminated by a corresponding lamp, each guide can be energized independently of the others.

Figure 4:
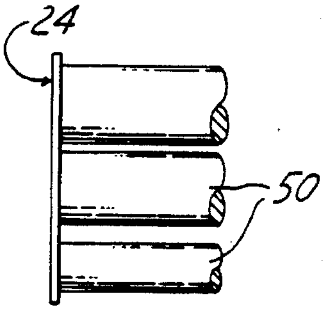
FIG. 4 is a side view of the image source of FIG. 3.
Figure 3:
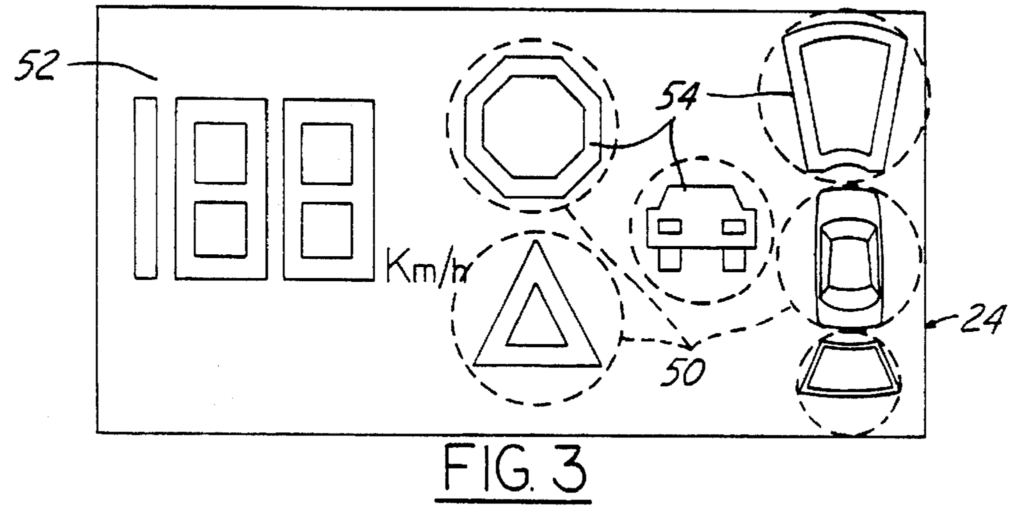
FIG. 3 is a front view of an image source of the head up display.

FIG. 3 shows an image source 24 having a display pattern including a speed display 52 and several icons 54 used for a vehicle warning system. Each of the icons must be separately displayed and thus each is illuminated by a specific light guide 50. The image source is preferably very small in order to minimize the HUD package under the dash, and the icons are therefore small, on the order of 5 or 6 mm diameter. Since each icon is fixed in shape, a patterned colored filter or slide 24 is profitably used as the image source, although a color LCD could be used. Each icon is separately lighted by a light guide 50 of similar size which is butted against the image source 24, as shown by the dotted lines 50 in FIG. 3 and by FIG. 4. This results in very uniform illumination. In practice bright displays suitable for use in bright sunlight were obtained by 6.4 mm and 4.8 mm diameter light guides 50, one meter long, illuminated by the source 34 of FIG. 2 using halogen lamps 48 of 10 watts each. The brightness obtained was 21,500 fl for a red icon, 25,000 fl for an amber icon, and 8,000 fl for a blue icon. Such brightness in these colors can not be obtained using VFD technology.

Figure 5:
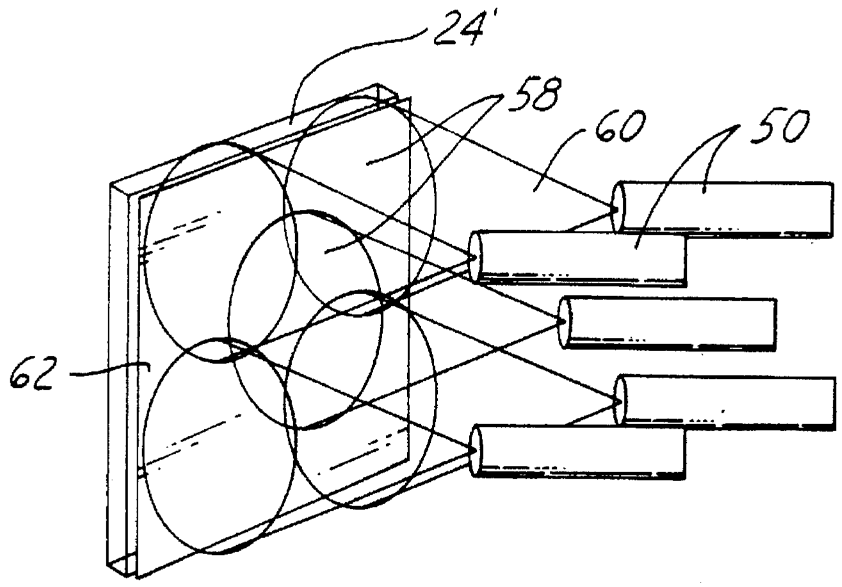
FIG. 5 is a schematic view of a large-area image source illuminated by a plurality of light guides, according to the invention.

The speed display 52 of FIG. 3 can be implemented by a VFD tube which also produces satisfactory brightness for a bluish-green color. Alternatively the speed is shown by a color LCD using the fiber optic back lighting. As shown in FIG. 5, a large display such as the speed indicator utilizes a color LCD 24' which is effectively illuminated by several light guides 50 spaced from the LCD 24' so that the conical light beams 60 emitted from the guides spread over the area of the image in overlapping patterns 58 to approximate even illumination. The light beams typically spread in a cone which has an included angle of less than 60° and the light guides 50 are spaced from the LCD sufficiently to collectively cover the area of the LCD. A diffuser 62 between the light guides 50 and the LCD 24' scatters the light for uniform illumination of the image.

Figure 6:
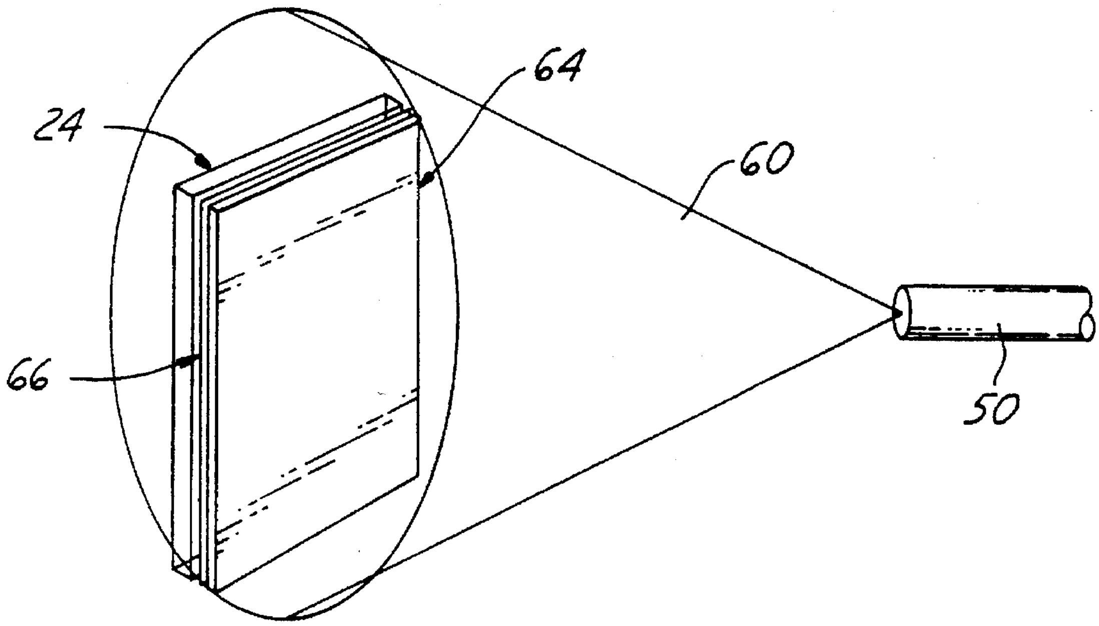
FIG. 6 is a schematic view of a large-area image source illuminated by a single light guide, according to the invention.

Another approach to illuminating an image source pattern which is larger than the light guide is by spacing the light guide end from the image source and incorporating collimating optics between the light guide end and the image source as illustrated in FIG. 6. The conical light beam 60 emitted from the light guide 50 covers the area of the image source 24. To assure uniform illumination, a Fresnel collimating lens 64 and a diffuser 66 are placed between the light guide 50 and the image source 24.

It will thus be appreciated that a light source remotely located from the image source of a HUD assembly is effectively coupled by fiber optic light guides to the image source to provide bright and uniform illumination. When coupled with a color filter image or a reconfigurable color LCD, a bright colored display is produced which is suitable for viewing in bright sunlight.

The embodiments of the invention in which an exclusive property or privilege is claimed are defined as follows:

1. A head up display for a vehicle comprising:

an image source including a color filter pattern;

optical means for projecting an image of the source into the field of view of a vehicle operator; and means for illuminating the image source comprising a light source remote from the image source and a plurality of fiber optic light guides between the light source and the image source for conducting light to the image source for illuminating the pattern;

the light source comprising a lamp for illuminating an end of each light guide, a holder for securing each light guide in alignment with a corresponding lamp, and means for protecting the light guides from heat from the lamps;

wherein the holder comprises a thermally conductive block having a parallel array of aligned apertures for securing light guides and lamps in alignment and spaced from one another, and an array of cooling apertures transverse to the aligned apertures for dissipating heat from the block.

2. The invention as defined in claim 1 wherein the means for protecting the light guides includes heat blocking glass between lamps and ends of light guides.

3. The invention as defined in claim 1 wherein the holder is thermally conductive and contains cooling apertures, and wherein the light source includes a fan for circulating cooling air about the holder.

4. The invention as defined in claim 1 wherein:

the holder comprises a pair of spaced thermally conductive blocks, each block having a plurality of bores, each bore holding a light guide and a corresponding lamp; and the means for protecting the light guides from heat includes cooling passages in the blocks and a fan between the spaced blocks for circulating air through the passages to dissipate heat generated by the lamps.

5. A head up display for a vehicle comprising:

an image source;

optical means for projecting an image of the source into the field of view of a vehicle operator; and means for illuminating the image source comprising a light source remote from the image source and a plurality of fiber optic light guides between the light source and the image source for conducting light to the image source;

the light source comprising a thermally conductive block having an array of apertures, a plurality of lamps and ends of the light guides respectively held in the apertures and aligned for illumination of each light guide by a lamp, means for protecting the light guides from heat from the lamps, and means for dissipating heat from the block.

6. The invention as defined in claim 5 wherein the means for dissipating heat from the block includes cooling apertures in the block.

7. The invention as defined in claim 5 wherein the means for dissipating heat from the block includes:

cooling apertures in the block transverse to the array of apertures; and a fan for circulating cooling air through the cooling apertures.

8. The invention as defined in claim 5 wherein the means for protecting the light guides from heat includes heat blocking glass between the lamps and the ends of the light guides.

* * * * *

UNITED STATES PATENT AND TRADEMARK OFFICE

CERTIFICATE OF CORRECTION

PATENT NO.: 5,957,163
DATED : September 28, 1999
INVENTOR(S): ITO et al.

It is certified that errors appear in the above-identified patent and that said Letters Patent is hereby corrected as shown below:

In the Claims;

In claim 1 on line 11 of column12, delete "an outer surface" and insert --structure--

In claim 16, on line 37 of column 13, change "filled" to --fitted--

In claim 16, on line 38 of column 13, change "hoco" to --hose--

In claim 19, on line 18 of column14, change "annual" to --annular--

In claim 20, on line 21 of column 14, change "within" to --wherein--

Delete claim 22 as requested in response dated October 1, 1998

Chamge Title page under Abstract " 25 claims " should be -- 24 claims --.

Signed and Sealed this

Thirty-first Day of October, 2000

Attest:

Q. TODD DICKINSON

*Attesting Officer* *Director of Patents and Trademarks*